United States Patent
Fan et al.

(10) Patent No.: US 10,581,740 B2
(45) Date of Patent: Mar. 3, 2020

(54) PACKET FORWARDING METHOD AND RELATED APPARATUS

(71) Applicant: Huawei Technologies Co., Ltd., Shenzhen (CN)

(72) Inventors: Duoliang Fan, Nanjing (CN); Heyang Liu, Nanjing (CN); Li Shen, Nanjing (CN); Hongguang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 15/877,966

(22) Filed: Jan. 23, 2018

(65) Prior Publication Data

US 2018/0152378 A1 May 31, 2018

Related U.S. Application Data

(63) Continuation of application No. PCT/CN2016/075300, filed on Mar. 2, 2016.

(30) Foreign Application Priority Data

Jul. 23, 2015 (CN) .......................... 2015 1 0437470

(51) Int. Cl.
*H04L 12/741* (2013.01)
*H04L 12/947* (2013.01)
(Continued)

(52) U.S. Cl.
CPC ............ *H04L 45/745* (2013.01); *H04L 49/25* (2013.01); *H04L 61/2007* (2013.01); *H04L 61/6022* (2013.01); *H04L 49/30* (2013.01)

(58) Field of Classification Search
CPC ....... H04L 45/745; H04L 45/08; H04L 45/74; H04L 45/00; H04L 45/60; H04L 45/7457;
(Continued)

(56) References Cited

U.S. PATENT DOCUMENTS 8,160,063 B2* 4/2012 Maltz ...................... H04L 45/02
370/254
9,008,095 B2* 4/2015 Kapadia ................ H04L 45/745
370/351
(Continued)

FOREIGN PATENT DOCUMENTS

CN 101098238 A 1/2008
CN 102238072 A 11/2011
(Continued)

OTHER PUBLICATIONS

Machine Translation and Abstract of Chinese Publication No. CN102238072, Nov. 9, 2011, 23 pages.
(Continued)

*Primary Examiner* — Un C Cho
*Assistant Examiner* — Rasha K Fayed
(74) *Attorney, Agent, or Firm* — Conley Rose, P.C.

(57) ABSTRACT

A packet forwarding method and a related apparatus to improve packet forwarding efficiency, where the method includes generating, by a controller, addressing information for a switching node, recording, by the controller, a correspondence between the switching node and the addressing information, and sending, by the controller, the addressing information to the switching node, so that the switching node forwards a packet according to the addressing information.

8 Claims, 6 Drawing Sheets

(51) Int. Cl.
*H04L 29/12* (2006.01)
*H04L 12/935* (2013.01)

(58) Field of Classification Search
CPC ......... H04L 45/54; H04L 45/02; H04L 45/28;
H04L 45/24; H04L 49/25; H04L 49/1523;
H04L 49/30; H04L 49/3009; H04L
49/356; H04L 49/109; H04L 49/15; H04L
49/201; H04L 49/253; H04L 49/351;
H04L 49/358; H04L 49/602; H04L
49/206; H04L 49/45; H04L 49/1515;
H04L 61/103; H04L 61/2007; H04L
61/6022; H04L 61/6009; H04L 12/1886;
H04L 12/4658; H04L 12/4641; H04L
12/28; H04L 12/56; H04L 2212/00; H04L
29/12811; H04L 47/10; H04L 47/12
See application file for complete search history.

(56) References Cited

U.S. PATENT DOCUMENTS

| | | | | |
|---|---|---|---|---|
| 2005/0111433 | A1* | 5/2005 | Stewart | H04L 49/1515 370/351 |
| 2009/0003327 | A1* | 1/2009 | Zang | H04L 49/15 370/359 |
| 2012/0314706 | A1* | 12/2012 | Liss | H04L 49/358 370/392 |
| 2014/0161131 | A1* | 6/2014 | Yang | H04L 45/54 370/401 |
| 2015/0131663 | A1* | 5/2015 | Brar | H04L 45/745 370/392 |
| 2015/0200847 | A1* | 7/2015 | Gourlay | H04L 49/70 370/392 |
| 2015/0381386 | A1* | 12/2015 | Sigoure | H04L 12/4645 370/392 |
| 2016/0142243 | A1* | 5/2016 | Karam | H04L 41/046 709/202 |

FOREIGN PATENT DOCUMENTS

| | | |
|---|---|---|
| CN | 102594689 A | 7/2012 |
| CN | 102835081 A | 12/2012 |

OTHER PUBLICATIONS

Machine Translation and Abstract of Chinese Publication No. CN102594689, Jul. 18, 2012, 17 pages.
Machine Translation and Abstract of Chinese Publication No. CN102835081, Dec. 19, 2012, 31 pages.
Theophilus, B., et al., "Network Traffic Characteristics of Data Centers in the Wild," IMC'10, Nov. 1-3, 2010 14 pages.
Greenberg, A., et al., "VL2: A Scalable and Flexible Data Center Network," SIGCOMM'09, Aug. 17-21, 2009, 12 pages.
Foreign Communication From A Counterpart Application, International Application No. PCT/CN2016/075300, English Translation of International Search Report dated May 24, 2016, 2 pages.

* cited by examiner

PACKET FORWARDING METHOD AND RELATED APPARATUS

CROSS-REFERENCE TO RELATED APPLICATIONS

This application is a continuation of International Patent Application No. PCT/CN2016/075300 filed on Mar. 2, 2016, which claims priority to Chinese Patent Application No. 201510437470.9 filed on Jul. 23, 2015. The disclosures of the aforementioned applications are hereby incorporated by reference in their entireties.

TECHNICAL FIELD

The present disclosure relates to the communications field, and in particular, to a packet forwarding method and a related apparatus.

BACKGROUND

A data center (DC) network is a network applied to a DC. Traffic in a DC features centralized data exchanging, a large east-to-west traffic volume, and the like, and therefore requirements such as a large scale, high scalability, high robustness, a low cost, and the like are further imposed on the DC network. In this background, currently, most large-scale DC networks are based on a CLOS architecture. The CLOS is a switching architecture with the features of re-arrangeable, non-blocking, and scalable.

A large-scale DC network requires highly efficient packet forwarding. For example, a 128-port switch is used to build a DC network (i.e., 5-stage CLOS) with three levels of switches. 524,288 servers can be supported, and 20,480 switches are required in total. How to efficiently forward packets between 524,288 servers according to the features of the CLOS architecture using the 20,480 switches is an urgent problem to be resolved.

The 5-stage CLOS architecture is an architecture in which a packet flow is forwarded along the route: leaf→agg→spine→agg→leaf. leaf is a switching node interconnected to a server, agg is a switching node for aggregation with leaf, and spine is a spine switching node. In other approaches, a solution to packet forwarding in the 5-stage CLOS architecture is put forward. The solution uses a hierarchical Media Access Control (MAC) address to forward a packet. A format of the MAC address includes POD.Position.Port.Vmid. Pool of Devices (POD) is a set of switches, and the POD has only one connection to each spine node. Position is a position of a leaf switch in the POD. For example, there are two leaf switches numbered 0 and 1 in a POD 0. Port is a port number of a leaf switch. For example, four port numbers of the leaf switch numbered 1 in the POD 0 are 0, 1, 2, and 3. Vmid is a serial number of a virtual machine on a physical machine. A control plane generates a forwarding table. In a process of forwarding a packet, a data plane looks up the table hop by hop according to a destination address of the packet in a longest match manner such that the packet is finally forwarded to a destination.

In a research process, the inventor finds that, when the DC network has a large capacity and many switching nodes, the solution requires a large number of entries, and a table lookup speed is low. Consequently, efficiency of packet forwarding is relatively low.

SUMMARY

The present disclosure provides a packet forwarding method and a related apparatus to improve packet forwarding efficiency.

A first aspect of the present disclosure provides a packet forwarding method, applied to a multistage switching network, and the method may include generating, by a controller, addressing information for a switching node, recording a correspondence between the switching node and the addressing information, and sending, by the controller, the addressing information to the switching node such that the switching node forwards a packet according to the addressing information, where the multistage switching network includes multiple switching nodes, the multiple switching nodes include a leaf node, an aggregation node, and a spine node, and the switching node is any one of the multiple switching nodes, where addressing information of a leaf node includes a vertical dimension plane number (VD_Num) of the leaf node, a value range of VD_Num is [0, np−1], p is a quantity of ports, on an aggregation node, connected to a leaf node located on a same vertical dimension plane with the aggregation node, and n is a quantity of aggregation nodes on one horizontal dimension plane, addressing information of an aggregation node includes a horizontal dimension plane number (HD_Num) of the aggregation node and a serial number of the aggregation node (agg_Num), a value range of HD_Num is [0, k−1], a value range of agg_Num is [0, n−1], and k is a quantity of ports, on a leaf node, connected to an aggregation node located on a same vertical dimension plane with the leaf node, and addressing information of a spine node includes an HD_Num of the spine node and a serial number of the spine node (spine_Num), a value range of HD_Num is [0, k−1], a value range of spine_Num is [0, m−1], and m is a quantity of spine nodes on one horizontal dimension plane.

With reference to the first aspect of the present disclosure, in a first implementation of the first aspect of the present disclosure, the correspondence between the switching node and the addressing information includes a correspondence between an Internet Protocol (IP) address of the switching node and the addressing information, and the method further includes receiving, by the controller, an Address Resolution Protocol (ARP) request sent by a server, where the ARP request carries the IP address of the switching node, and sending, by the controller, an ARP response to the server according to the correspondence, where the ARP response carries the addressing information such that the server uses the addressing information as a MAC address of the switching node when sending a packet.

A second aspect of the present disclosure provides a packet forwarding method, applied to a multistage switching network, and the method may include obtaining, by a switching node, addressing information that is of the switching node and that is sent by a controller, receiving a packet by the switching node, where a destination MAC address field of the packet carries addressing information of a destination leaf node, and an IP address field of the packet carries an IP address of a destination server, obtaining, by the switching node, a forwarding port of the packet, and forwarding the packet using the forwarding port, where when the switching node is a leaf node, the addressing information includes a VD_Num of the leaf node, a value range of VD_Num is [0, np−1], p is a quantity of ports, on an aggregation node connected to a leaf node located on a same vertical dimension plane with the aggregation node, and n is a quantity of aggregation nodes on one horizontal dimension plane, when the switching node is an aggregation node, the addressing information includes an HD_Num and an agg_Num of the aggregation node, a value range of HD_Num is [0, k−1], a value range of agg_Num is [0, n−1], and k is a quantity of ports, on a leaf node, connected to an aggregation node located on a same vertical dimension plane with the leaf node, and when the switching node is a spine node, the addressing information includes an HD_Num and a spine_Num of the spine node, a value range of HD_Num is [0, k−1], a value range of spine_Num is [0, m−1], and m is a quantity of spine nodes on one horizontal dimension plane.

With reference to the second aspect of the present disclosure, in a first implementation of the second aspect of the present disclosure, the switching node is a leaf node, and obtaining a forwarding port of the packet, and forwarding the packet using the forwarding port includes determining, by the switching node, a source of the packet, and when the packet is from another switching node, obtaining, by the switching node, a MAC address of the destination server and a forwarding port corresponding to the MAC address, and sending the packet to the destination server using the forwarding port after replacing the addressing information of the destination leaf node in the MAC address field of the packet with the MAC address of the destination server, or when the packet is from a server, obtaining, by the switching node, a forwarding port connected to an aggregation node, and forwarding the packet using the forwarding port.

With reference to the second aspect of the present disclosure, in a second implementation of the second aspect of the present disclosure, the switching node is an aggregation node, and obtaining a forwarding port of the packet, and forwarding the packet using the forwarding port includes determining, by the switching node, a source of the packet, and when the packet is from a leaf node, determining, by the switching node, whether addressing information of an aggregation node corresponding to the destination leaf node is consistent with the addressing information of the switching node, and if the addressing information of the aggregation node corresponding to the destination leaf node is consistent with the addressing information of the switching node, obtaining, by the switching node, a first forwarding port by means of calculation according to the addressing information of the destination leaf node, and sending the packet to the destination leaf node using the first forwarding port, where the first forwarding port is a port over which the switching node communicates with the destination leaf node, or obtaining, by the switching node, a second forwarding port connected to a spine node, and forwarding the packet using the second forwarding port if the addressing information of the aggregation node corresponding to the destination leaf node is inconsistent with the addressing information of the switching node.

With reference to the second aspect of the present disclosure, in a third implementation of the second aspect of the present disclosure, the switching node is a spine node, and receiving a packet by the switching node includes receiving, by the switching node, the packet from an aggregation node, and obtaining, by the switching node, a forwarding port of the packet, and forwarding the packet using the forwarding port includes determining, by the switching node according to the addressing information of the destination leaf node, a forwarding port over which a destination aggregation node corresponding to the destination leaf node communicates with the switching node, and sending the packet to the destination aggregation node using the forwarding port such that the destination aggregation node sends the packet to the destination leaf node.

A third aspect of the present disclosure provides a controller, applied to a multistage switching network, and the controller may include a processor configured to generate addressing information for a switching node, and record a correspondence between the switching node and the addressing information, and a transmitter configured to send the addressing information to the switching node such that the switching node forwards a packet according to the addressing information, where the multistage switching network includes multiple switching nodes, the multiple switching nodes include a leaf node, an aggregation node, and a spine node, and the switching node is any one of the multiple switching nodes, where addressing information of a leaf node includes a VD_Num of the leaf node, a value range of VD_Num is [0, np−1], p is a quantity of ports, on an aggregation node, connected to a leaf node located on a same vertical dimension plane with the aggregation node, and n is a quantity of aggregation nodes on one horizontal dimension plane, addressing information of an aggregation node includes an HD_Num and an agg_Num, a value range of HD_Num is [0, k−1], a value range of agg_Num is [0, n−1], and k is a quantity of ports, on a leaf node, connected to an aggregation node located on a same vertical dimension plane with the leaf node, and addressing information of a spine node includes an HD_Num and a spine_Num of the spine node, a value range of HD_Num is [0, k−1], a value range of spine_Num is [0, m−1], and m is a quantity of spine nodes on one horizontal dimension plane.

With reference to the third aspect of the present disclosure, in a first implementation of the third aspect of the present disclosure, the correspondence between the switching node and the addressing information includes a correspondence between an IP address of the switching node and the addressing information, the controller further includes a receiver configured to receive an ARP request sent by a server, where the ARP request carries the IP address of the switching node, and the processor is further configured to send an ARP response to the server according to the correspondence, where the ARP response carries the addressing information such that the server uses the addressing information as a MAC address of the switching node when sending a packet.

A fourth aspect of the present disclosure provides a switching node, applied to a multistage switching network, and the switching node may include a receiver configured to receive a packet, where a destination MAC address field of the packet carries addressing information of a destination leaf node, and an IP address field of the packet carries an IP address of a destination server, and a processor configured to obtain addressing information that is of the switching node and that is sent by a controller, and obtain a forwarding port of the packet, and forward the packet using the forwarding port, where when the switching node is a leaf node, the addressing information includes a VD_Num of the leaf node, a value range of VD_Num is [0, np−1], p is a quantity of ports, on an aggregation node connected to a leaf node located on a same vertical dimension plane with the aggregation node, and n is a quantity of aggregation nodes on one horizontal dimension plane, when the switching node is an aggregation node, the addressing information includes an HD_Num and an agg_Num of the aggregation node, a value range of HD_Num is [0, k−1], a value range of agg_Num is [0, n−1], and k is a quantity of ports, on a leaf node, connected to an aggregation node located on a same vertical dimension plane with the leaf node, and when the switching node is a spine node, the addressing information includes an HD_Num and an spine_Num of the spine node, a value range of HD_Num is [0, k−1], a value range of spine_Num is [0, m−1], and m is a quantity of spine nodes on one horizontal dimension plane.

With reference to the fourth aspect of the present disclosure, in a first implementation of the fourth aspect of the present disclosure, the switching node is a leaf node, and the processor is further configured to obtain the addressing information that is of the switching node and that is sent by the controller, determine a source of the packet, and when the packet is from another switching node, obtain a MAC address of the destination server and a forwarding port corresponding to the MAC address, and send the packet to the destination server using the forwarding port after replacing the addressing information of the destination leaf node in the MAC address field of the packet with the MAC address of the destination server, or obtain a forwarding port connected to an aggregation node, and forward the packet using the forwarding port when the packet is from a server.

With reference to the fourth aspect of the present disclosure, in a second implementation of the fourth aspect of the present disclosure, the switching node is an aggregation node, and the processor is further configured to obtain the addressing information that is of the switching node and that is sent by the controller, determine a source of the packet, and when the packet is from a leaf node, determine whether addressing information of an aggregation node corresponding to the destination leaf node is consistent with the addressing information of the switching node, and if the addressing information of the aggregation node corresponding to the destination leaf node is consistent with the addressing information of the switching node, obtain a first forwarding port by means of calculation according to the addressing information of the destination leaf node, and send the packet to the destination leaf node using the first forwarding port, where the first forwarding port is a port over which the switching node communicates with the destination leaf node, or obtain a second forwarding port connected to a spine node, and forward the packet using the second forwarding port if the addressing information of the aggregation node corresponding to the destination leaf node is inconsistent with the addressing information of the switching node.

With reference to the fourth aspect of the present disclosure, in a third implementation of the fourth aspect of the present disclosure, the switching node is a spine node, and receiving a packet by the switching node includes receiving, by the switching node, the packet from an aggregation node, and the processor is further configured to obtain the addressing information that is of the switching node and that is sent by the controller, determine, according to the addressing information of the destination leaf node, a forwarding port over which a destination aggregation node corresponding to the destination leaf node communicates with the switching node, and send the packet to the destination aggregation node using the forwarding port such that the destination aggregation node sends the packet to the destination leaf node.

It may be learned from the foregoing technical solutions that, the present disclosure has the following advantages. The controller generates the addressing information for the switching node, and records the correspondence between the switching node and the addressing information. The controller sends the addressing information to the switching node such that the switching node forwards the packet according to the addressing information. Therefore, when forwarding the packet, the switching node can obtain the corresponding forwarding port by means of calculation according to the addressing information generated by the controller, and forward the packet using the corresponding forwarding port with no need to look up a table. Therefore, packet forwarding efficiency is improved.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

It should be understood that although terms "first" and "second" are used in the embodiments of the present disclosure to describe forwarding ports or modules, the forwarding ports or the modules are not limited by these terms. These terms are merely used to differentiate the forwarding ports or the modules. For example, without departing from the scope of the embodiments of the present disclosure, a first forwarding port may also be referred to as a second forwarding port, and similarly, a second forwarding port may also be referred to as a first forwarding port, likewise, a second forwarding port may also be referred to as a third forwarding port, and this is not limited in the embodiments of the present disclosure.

Figure 1:
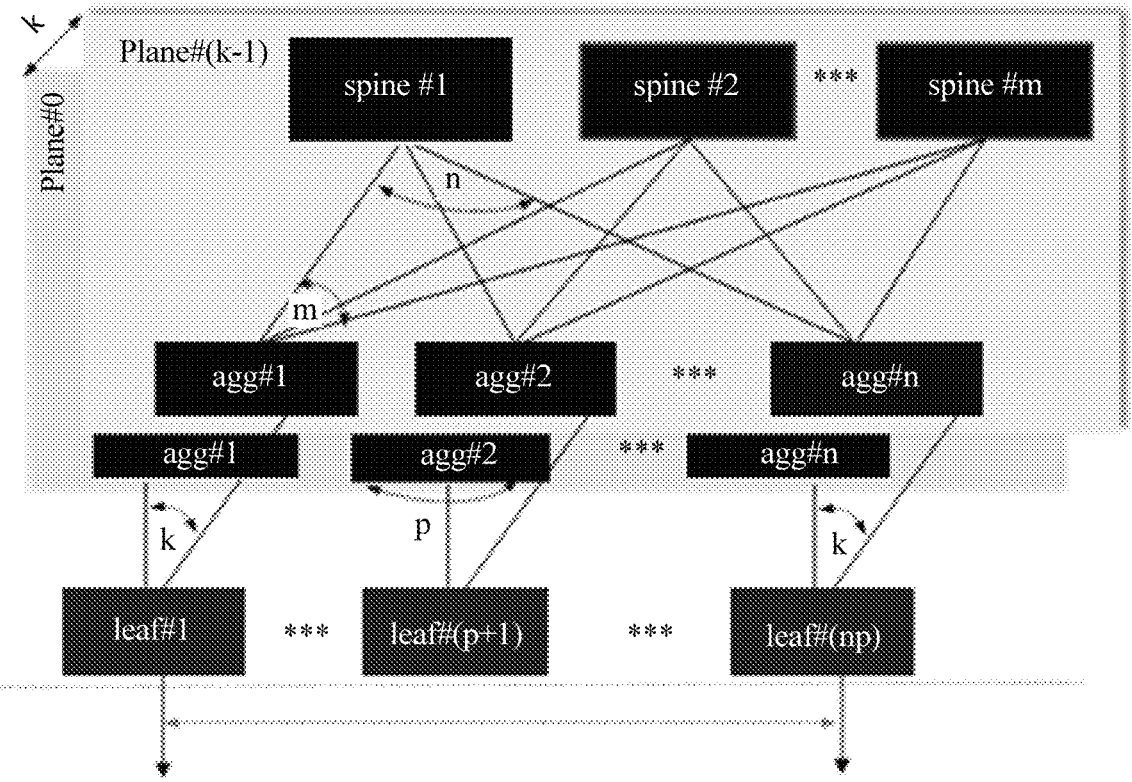
FIG. 1 is a schematic diagram of a topology structure of a multistage switching network according to the present disclosure.

The present disclosure provides a packet forwarding method, applied to a multistage switching network. As shown in FIG. 1, a 5-stage CLOS topology structure at a multi-plane visual angle in the multistage switching network is described. In FIG. 1, a quantity of ports, on a leaf node, connected to an aggregation (designated as agg) node located on a same vertical dimension plane with the leaf node is k, and a quantity of ports, on an aggregation node, connected to a leaf node located on a same vertical dimension plane with the aggregation node is p. Therefore, the structure has k (from plane #0 to plane #(k−1)) horizontal dimension planes in total. The vertical dimension plane is orthogonal to the horizontal dimension plane. There are np leaf nodes in total in FIG. 1, and therefore the 5-stage CLOS may be abstracted as orthogonality of k horizontal dimension planes to np vertical dimension planes. In FIG. 1, each horizontal dimension plane includes m spine nodes, n aggregation nodes, and each vertical dimension plane includes one leaf node.

Figure 2:
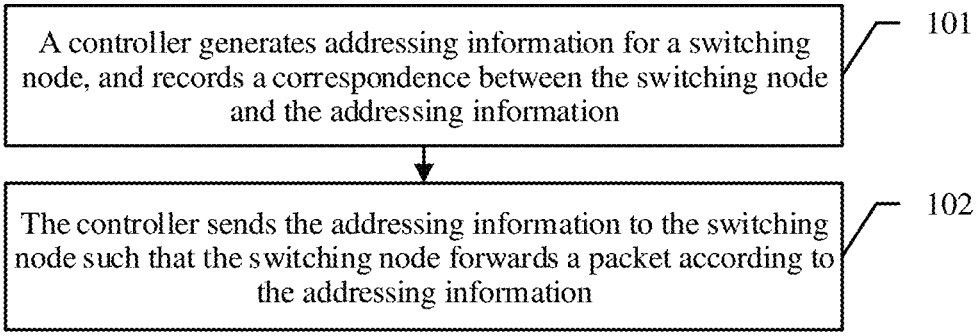
FIG. 2 is a schematic flowchart of an embodiment of a packet forwarding method according to the present disclosure.

The method is mainly executed by a controller. Referring to FIG. 2, an embodiment of the packet forwarding method provided in the present disclosure includes the following steps.

Step 101: The controller generates addressing information for a switching node, and records a correspondence between the switching node and the addressing information.

It should be noted that, the multistage switching network includes multiple switching nodes, the multiple switching nodes include a leaf node, an aggregation node, and a spine node, and the switching node is any one of the multiple switching nodes.

Addressing information of a leaf node includes a VD_Num of the leaf node, a value range of VD_Num is [0, np−1], p is a quantity of ports, on an aggregation node, connected to a leaf node located on a same vertical dimension plane with the aggregation node, n is a quantity of aggregation nodes on one horizontal dimension plane, and a port corresponding to an aggregation node in an HD orthogonal to a vertical dimension plane on which the leaf node is located can be obtained using VD_Num/p by means of calculation.

Addressing information of an aggregation node includes an HD_Num and an agg_Num of the aggregation node, a value range of HD_Num is [0, k−1], a value range of agg_Num is [0, n−1], and k is a quantity of ports, on a leaf node, connected to an aggregation node located on a same vertical dimension plane with the leaf node. For example, in FIG. 1, in a horizontal dimension, there are k planes in total from bottom to top, and there are n aggregation nodes in total on one horizontal dimension plane from left to right.

Addressing information of a spine node includes an HD_Num and a spine_Num of the spine node, a value range of HD_Num is [0, k−1], a value range of spine_Num is [0, m−1], and m is a quantity of spine nodes on one horizontal dimension plane. For example, in FIG. 1, in a horizontal dimension, there are k planes in total from bottom to top, and there are m spine nodes in total on one horizontal dimension plane from left to right.

Step 102: The controller sends the addressing information to the switching node such that the switching node forwards a packet according to the addressing information.

It should be noted that, the controller sends the generated addressing information to the switching node such that the switching node can obtain a corresponding forwarding port by means of calculation according to the addressing information, and forward the packet using the corresponding forwarding port.

In this embodiment of the present disclosure, the controller generates the addressing information for the switching node, and records the correspondence between the switching node and the addressing information. The controller sends the addressing information to the switching node such that the switching node forwards the packet according to the addressing information. Therefore, when forwarding the packet, the switching node can obtain the corresponding forwarding port by means of calculation according to the addressing information generated by the controller, and forward the packet using the corresponding forwarding port with no need to look up a table. Therefore, packet forwarding efficiency is improved.

Figure 3:
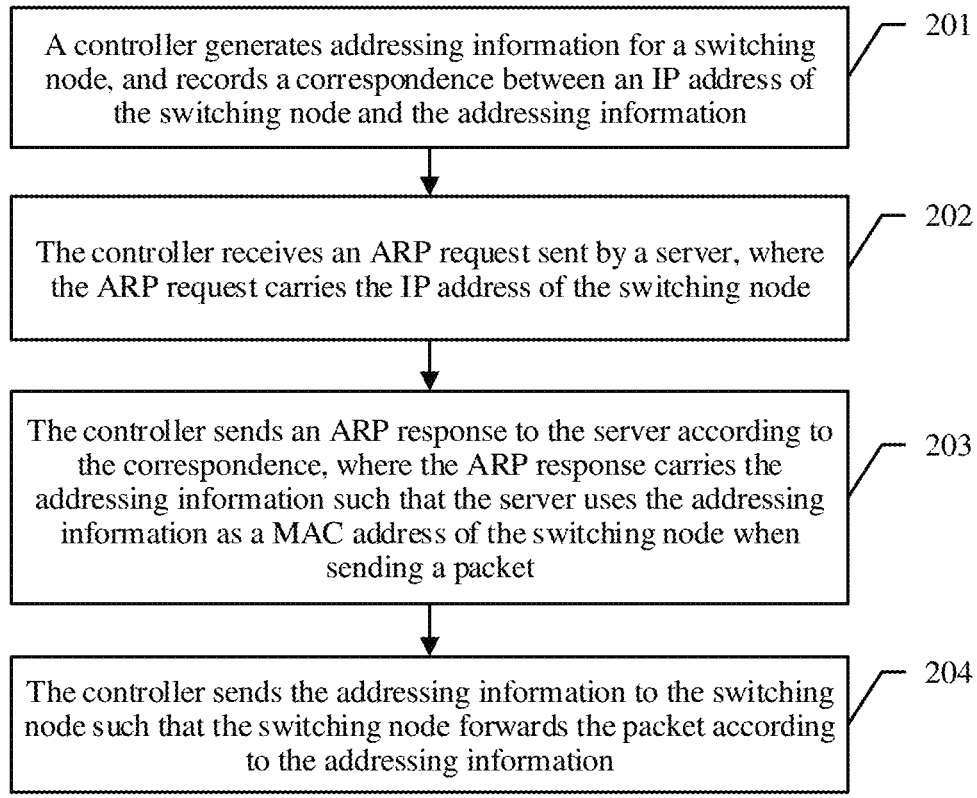
FIG. 3 is a schematic flowchart of another embodiment of a packet forwarding method according to the present disclosure.

Referring to FIG. 3, another embodiment of the packet forwarding method provided in the present disclosure includes the following steps.

Step 201: A controller generates addressing information for a switching node, and records a correspondence between an IP address of the switching node and the addressing information.

It should be noted that, the controller generates the addressing information for the switching node, and records the correspondence between the IP address of the switching node and the addressing information. For the addressing information, refer to relevant description in step 101, and details are not described herein.

Step 202: The controller receives an ARP request sent by a server, where the ARP request carries the IP address of the switching node.

It should be noted that, the controller receives the ARP request sent by the server, where the ARP request carries the IP address of the switching node.

Step 203: The controller sends an ARP response to the server according to the correspondence, where the ARP response carries the addressing information such that the server uses the addressing information as a MAC address of the switching node when sending a packet.

Step 204: The controller sends the addressing information to the switching node such that the switching node forwards the packet according to the addressing information.

In this embodiment of the present disclosure, the controller receives the ARP request sent by the server, and sends the ARP response to the server according to the correspondence such that the server uses the addressing information as the MAC address of the switching node when sending the packet to improve packet forwarding efficiency.

Figure 4:
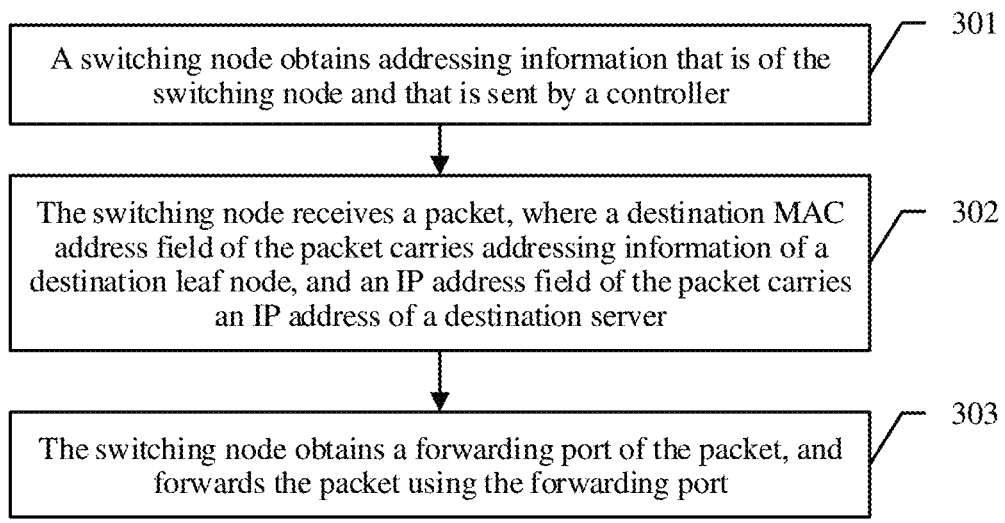
FIG. 4 is a schematic flowchart of another embodiment of a packet forwarding method according to the present disclosure.

This method is mainly executed by a switching node. Referring to FIG. 4, another embodiment of a packet forwarding method provided in the present disclosure includes the following steps.

Step 301: The switching node obtains addressing information that is of the switching node and that is sent by a controller.

Step 302: The switching node receives a packet, where a destination MAC address field of the packet carries addressing information of a destination leaf node, and an IP address field of the packet carries an IP address of a destination server.

Step 303: The switching node obtains a forwarding port of the packet, and forwards the packet using the forwarding port.

It should be noted that, a multistage switching network includes multiple switching nodes, the multiple switching nodes include a leaf node, an aggregation node, and a spine node, and the switching node is any one of the multiple switching nodes.

When the switching node is a leaf node, the addressing information includes a VD_Num of the leaf node, a value range of VD_Num is [0, np−1], p is a quantity of ports, on an aggregation node, connected to a leaf node located on a same vertical dimension plane with the aggregation node, n is a quantity of aggregation nodes on one horizontal dimension plane, and a port corresponding to an aggregation node in an horizontal dimension orthogonal to a vertical dimension plane on which the leaf node is located can be obtained using VD_Num/p by means of calculation.

When the switching node is an aggregation node, the addressing information includes an HD_Num and an agg_Num of the aggregation node, a value range of HD_Num is [0, k−1], a value range of agg_Num is [0, n−1], and k is a quantity of ports, on a leaf node, connected to an aggregation node located on a same vertical dimension plane with the leaf node. For example, in FIG. 1, in an horizontal dimension, there are k planes in total from bottom to top, and there are n aggregation nodes in total on one horizontal dimension plane from left to right.

When the switching node is a spine node, the addressing information includes an HD_Num and a spine_Num of the spine node, a value range of HD_Num is [0, k−1], a value range of spine_Num is [0, m−1], and m is a quantity of spine nodes on one horizontal dimension plane. For example, in FIG. 1, in an horizontal dimension, there are k planes in total from bottom to top, and there are m spine nodes in total on one horizontal dimension plane from left to right. In this embodiment of the present disclosure, the switching node obtains the addressing information that is of the switching node and that is sent by the controller. The switching node receives the packet, obtains the forwarding port of the packet, and forwards the packet using the forwarding port. Therefore, when forwarding the packet, the switching node can obtain the forwarding port of the packet according to the determined addressing information, and forward the packet using the forwarding port with no need to look up a table. Therefore, packet forwarding efficiency is improved.

Figure 5:
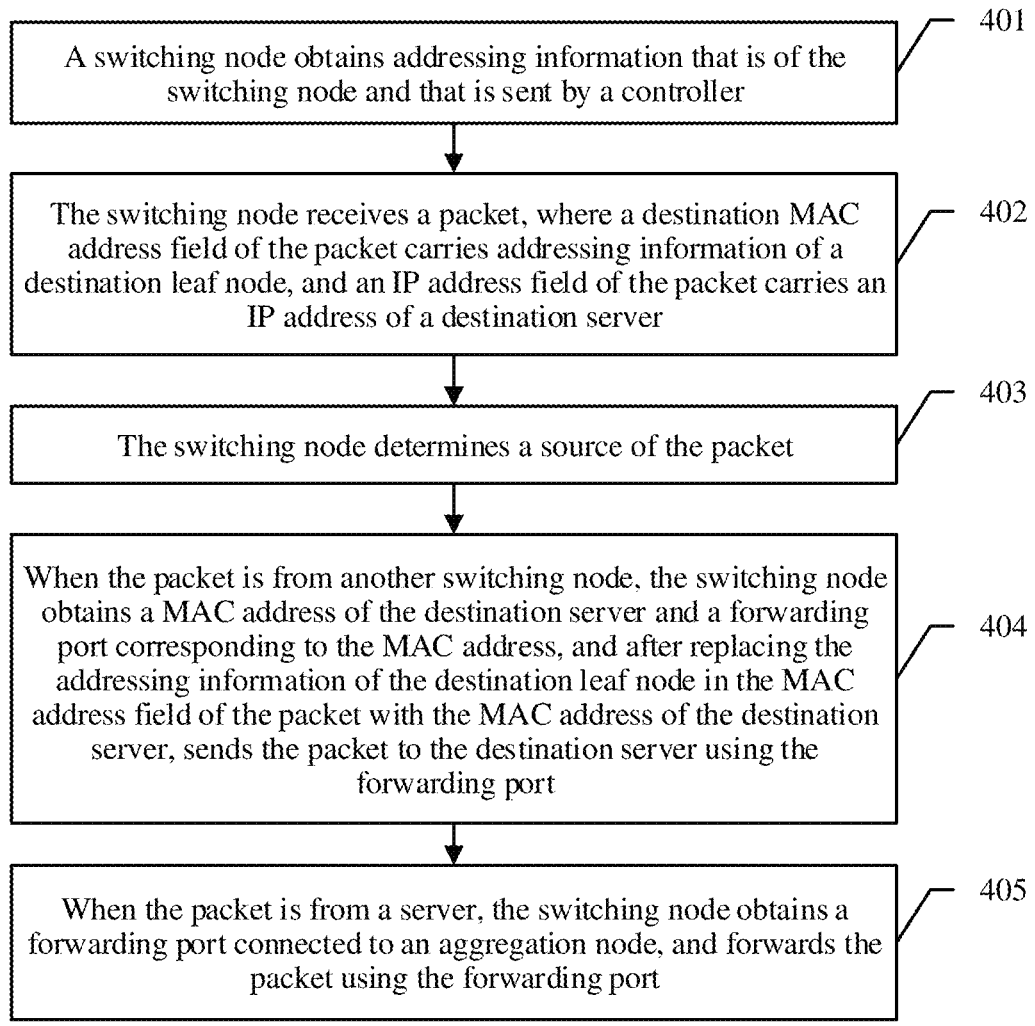
FIG. 5 is a schematic flowchart of another embodiment of a packet forwarding method according to the present disclosure.

The following describes the packet forwarding method from a perspective of a leaf node. Referring to FIG. 5, the switching node is a leaf node, and another embodiment of the packet forwarding method provided in the present disclosure includes the following steps.

Step 401: The switching node obtains addressing information that is of the switching node and that is sent by a controller.

Step 402: The switching node receives a packet, where a destination MAC address field of the packet carries addressing information of a destination leaf node, and an IP address field of the packet carries an IP address of a destination server.

It should be noted that, the destination leaf node is a destination port of the leaf node in packet forwarding, and for the addressing information of the destination leaf node, refer to addressing description in step 303.

Step 403: The switching node determines a source of the packet.

Step 404: When the packet is from another switching node, the switching node obtains a MAC address of the destination server and a forwarding port corresponding to the MAC address, and after replacing the addressing information of the destination leaf node in the MAC address field of the packet with the MAC address of the destination server, sends the packet to the destination server using the forwarding port.

It should be noted that, when the packet is from another switching node, the switching node obtains the MAC address of the destination server and the forwarding port corresponding to the MAC address by querying an ARP table learned by other switching node or by sending an ARP request to the destination server.

Step 405: When the packet is from a server, the switching node obtains a forwarding port connected to an aggregation node, and forwards the packet using the forwarding port.

It should be noted that, one leaf node may be connected to multiple aggregation nodes. A switch usually knows an uplink port and a downlink port. Generally, the downlink port is connected to a server, the uplink port is connected to a higher-level device, and all switches know their own uplink ports. Therefore, that the switching node obtains a forwarding port connected to an aggregation node may be obtaining a port connected to any aggregation node.

In this embodiment of the present disclosure, the switching node determines the source of the packet. When the packet is from another switching node, the switching node obtains the MAC address of the destination server and the forwarding port corresponding to the MAC address, and after replacing the addressing information of the destination leaf node in the MAC address field of the packet with the MAC address of the destination server, sends the packet to the destination server using the forwarding port. When the packet is from the server, the switching node obtains the forwarding port connected to the aggregation node, and forwards the packet using the forwarding port. Therefore, there is no need to look up a table in a packet forwarding process, and packet forwarding efficiency is improved. In addition, in this embodiment of the present disclosure, extra header overheads do not need to be increased for the packet, and this improves network utilization. In addition, this embodiment of the present disclosure is further applicable to network architectures such as a 7-stage CLOS, a 9-stage CLOS, and a multi-plane Mesh structure.

Figure 6:
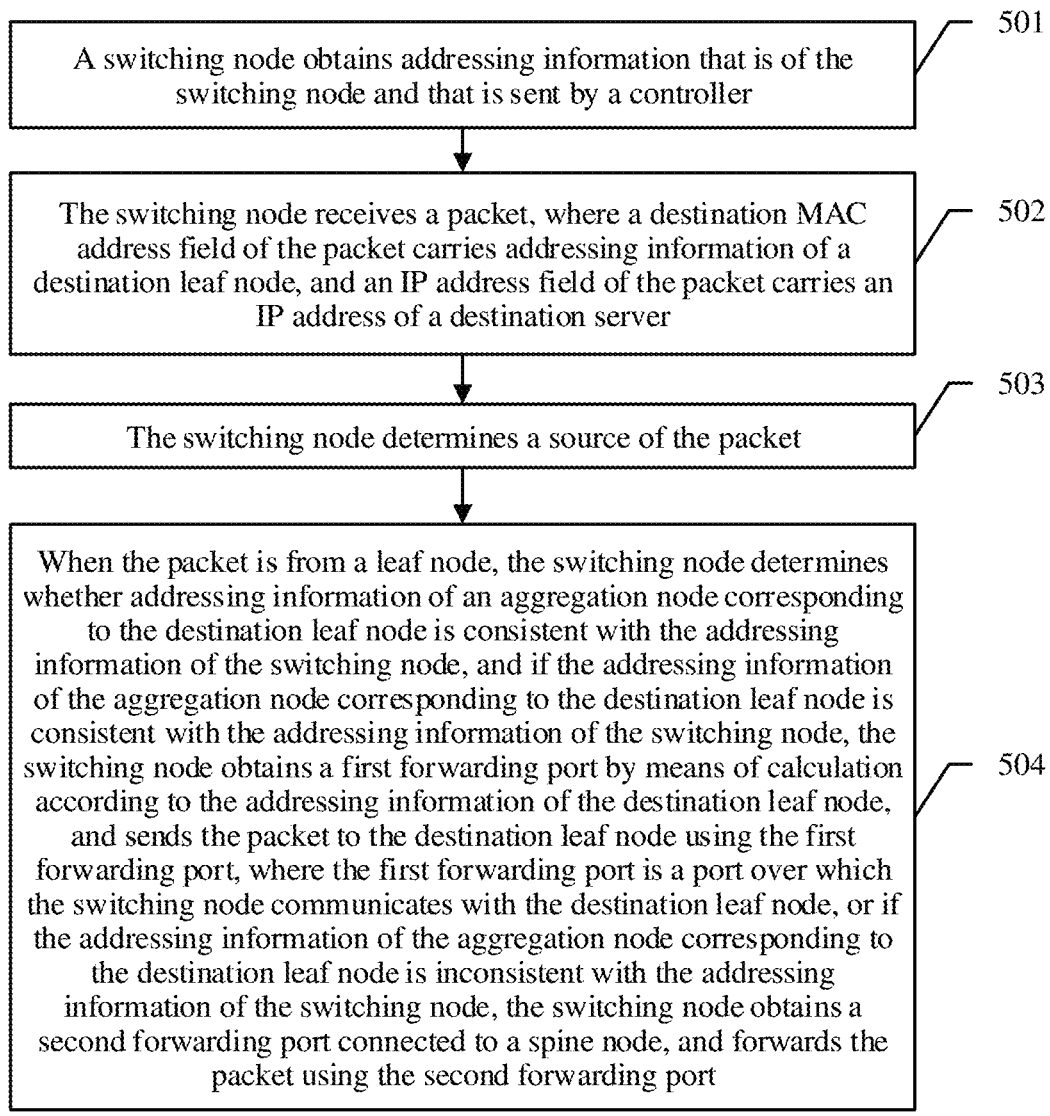
FIG. 6 is a schematic flowchart of another embodiment of a packet forwarding method according to the present disclosure.

The following describes the packet forwarding method from a perspective of an aggregation node. Referring to FIG. 6, the switching node is an aggregation node, and another embodiment of the packet forwarding method provided in the present disclosure includes the following steps.

Step 501: The switching node obtains addressing information that is of the switching node and that is sent by a controller.

Step 502: The switching node receives a packet, where a destination MAC address field of the packet carries addressing information of a destination leaf node, and an IP address field of the packet carries an IP address of a destination server.

Step 503: The switching node determines a source of the packet.

Step 504: When the packet is from a leaf node, the switching node determines whether addressing information of an aggregation node corresponding to the destination leaf node is consistent with the addressing information of the switching node, and if the addressing information of the aggregation node corresponding to the destination leaf node is consistent with the addressing information of the switching node, the switching node obtains a first forwarding port by means of calculation according to the addressing information of the destination leaf node, and sends the packet to the destination leaf node using the first forwarding port, where the first forwarding port is a port over which the switching node communicates with the destination leaf node, or if the addressing information of the aggregation node corresponding to the destination leaf node is inconsistent with the addressing information of the switching node, the switching node obtains a second forwarding port connected to a spine node, and forwards the packet using the second forwarding port.

It should be noted that, a calculation formula of the first forwarding port is VD_Num/p, and a result obtained by means of calculation needs to be rounded and reserves only an integer. VD_Num is a VD_Num of the destination leaf node, and p is a quantity of ports, on an aggregation node, connected to a leaf node located on a same vertical dimension plane with the aggregation node.

The switching node obtains the second forwarding port connected to the spine node, and forwards the packet using the second forwarding port. One aggregation node may be connected to multiple spine nodes, and the second forwarding port that is connected to the spine node and that is obtained by the switching node may be a port connected to any spine node.

In this embodiment of the present disclosure, the switching node determines the source of the packet. When the packet is from a leaf node, the switching node determines whether the addressing information of the aggregation node corresponding to the destination leaf node is consistent with the addressing information of the switching node, and if the addressing information of the aggregation node corresponding to the destination leaf node is consistent with the addressing information of the switching node, the switching node obtains the first forwarding port by means of calculation according to the addressing information of the destination leaf node, and sends the packet to the destination leaf node using the first forwarding port, where the first forwarding port is a port over which the switching node communicates with the destination leaf node, or if the addressing information of the aggregation node corresponding to the destination leaf node is inconsistent with the addressing information of the switching node, the switching node obtains the second forwarding port connected to a spine node, and forwards the packet using the second forwarding port. Therefore, there is no need to look up a table in a packet forwarding process, and packet forwarding efficiency is improved. In addition, in this embodiment of the present disclosure, extra header overheads do not need to be increased for the packet, and this improves network utilization. In addition, this embodiment of the present disclosure is further applicable to network architectures such as a 7-stage CLOS, a 9-stage CLOS, and a multi-plane Mesh structure.

Figure 7:
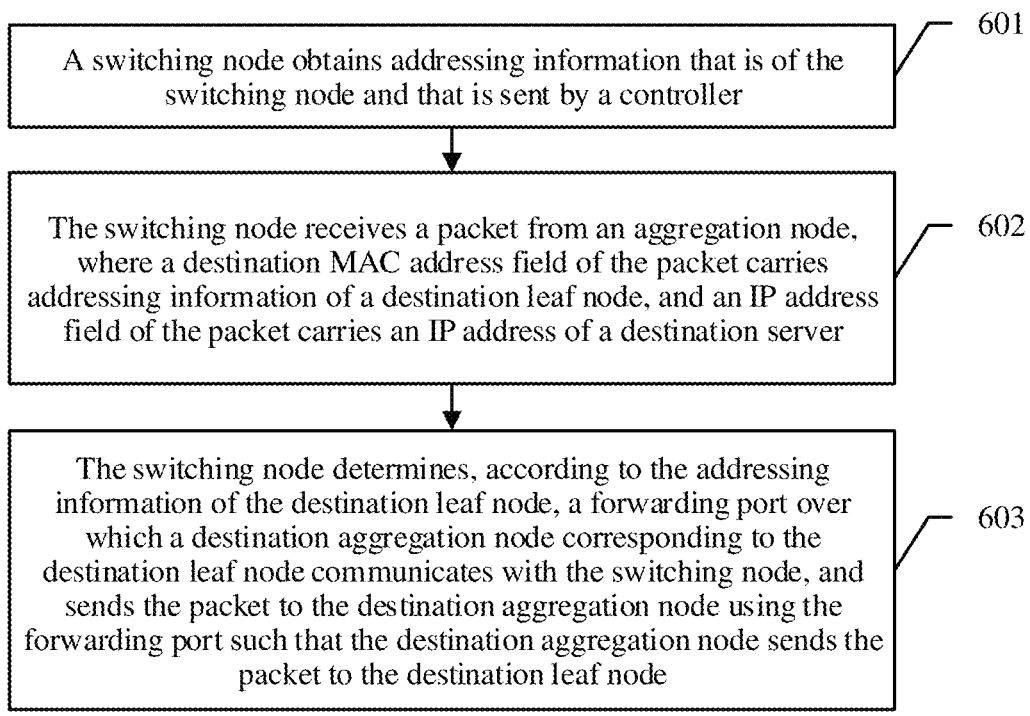
FIG. 7 is a schematic flowchart of another embodiment of a packet forwarding method according to the present disclosure.

The following describes the packet forwarding method from a perspective of a spine node. Referring to FIG. 7, the switching node is a spine node, and another embodiment of the packet forwarding method provided in the present disclosure includes the following steps.

Step 601: The switching node obtains addressing information that is of the switching node and that is sent by a controller.

Step 602: The switching node receives a packet from an aggregation node, where a destination MAC address field of the packet carries addressing information of a destination leaf node, and an IP address field of the packet carries an IP address of a destination server.

Step 603: The switching node determines, according to the addressing information of the destination leaf node, a forwarding port over which a destination aggregation node corresponding to the destination leaf node communicates with the switching node, and sends the packet to the destination aggregation node using the forwarding port such that the destination aggregation node sends the packet to the destination leaf node.

It should be noted that, the switching node determines, according to the addressing information of the destination leaf node and a calculation formula VD_Num mod(p), the destination aggregation node corresponding to the destination leaf node in order to determine a forwarding port for communicating with the destination aggregation node, and sends the packet to the destination aggregation node using the forwarding port such that the destination aggregation node sends the packet to the destination leaf node. VD_Num is a VD_Num of the destination leaf node, mod is a mod function, and p is a quantity of ports, on an aggregation node, connected to a leaf node located on a same vertical dimension plane with the aggregation node.

In this embodiment of the present disclosure, the switching node determines, according to the addressing information of the destination leaf node, the forwarding port over which the destination aggregation node corresponding to the destination leaf node communicates with the switching node, and sends the packet to the destination aggregation node using the forwarding port such that the destination aggregation node sends the packet to the destination leaf node. Therefore, there is no need to look up a table in a packet forwarding process, and packet forwarding efficiency is improved. In addition, in this embodiment of the present disclosure, extra header overheads do not need to be increased for the packet, and this improves network utilization. In addition, this embodiment of the present disclosure is further applicable to network architectures such as a 7-stage CLOS, a 9-stage CLOS, and a multi-plane Mesh structure.

For ease of understanding, the following uses a specific application scenario to describe in detail the packet forwarding method in this embodiment of the present disclosure.

This scenario uses a 5-stage CLOS as an example for description. For the network architectures such as the 7-stage CLOS, the 9-stage CLOS, and the multi-plane Mesh structure, reference may be correspondingly made.

In the 5-stage CLOS, a controller generates addressing information for the switching node and records a correspondence between the switching node and the addressing information, and the correspondence includes a correspondence between an IP address of the switching node and the addressing information. Addressing information of a leaf node includes a VD_Num of the leaf node, a value range of VD_Num is [0, np−1], p is a quantity of ports, on an aggregation node, connected to a leaf node located on a same vertical dimension plane with the aggregation node, and n is a quantity of aggregation nodes on one horizontal dimension plane.

Addressing information of an aggregation node includes an HD_Num and an agg_Num of the aggregation node, a value range of HD_Num is [0, k−1], a value range of agg_Num is [0, n−1], and k is a quantity of ports, on a leaf node, connected to an aggregation node located on a same vertical dimension plane with the leaf node.

Addressing information of a spine node includes an HD_Num and a spine_Num of the spine node, a value range of HD_Num is [0, k−1], a value range of spine_Num is [0, m−1], and m is a quantity of spine nodes on one horizontal dimension plane.

Based on the foregoing addressing information, a packet forwarding process is as follows.

1. The switching node is a leaf node.

The switching node obtains the addressing information that is of the switching node and that is sent by the controller.

The switching node receives the packet, where the destination MAC address field of the packet carries the addressing information of the destination leaf node, and the IP address field of the packet carries the IP address of the destination server.

The switching node determines a source of the packet.

When the packet is from another switching node, the switching node obtains a MAC address of the destination server and a forwarding port corresponding to the MAC address by querying an ARP table learned by the other switching node or by sending an ARP request to the destination server, and after replacing the addressing information of the destination leaf node in the MAC address field of the packet with the MAC address of the destination server, sends the packet to the destination server using the forwarding port.

When the packet is from a server, the switching node obtains a forwarding port connected to an aggregation node, and forwards the packet using the forwarding port. The forwarding port connected to the aggregation node may be a port connected to any aggregation node.

2. The switching node is an aggregation node.

The switching node obtains the addressing information that is of the switching node and that is sent by the controller.

The switching node receives the packet, where the destination MAC address field of the packet carries the addressing information of the destination leaf node, and the IP address field of the packet carries the IP address of the destination server.

The switching node determines a source of the packet.

When the packet is from a leaf node, the switching node determines whether addressing information of an aggregation node corresponding to the destination leaf node is consistent with the addressing information of the switching node, and if the addressing information of the aggregation node corresponding to the destination leaf node is consistent with the addressing information of the switching node, the switching node obtains a first forwarding port by means of calculation according to the addressing information of the destination leaf node and a calculation formula VD_Num/p, and sends the packet to the destination leaf node using the first forwarding port, where the first forwarding port is a port over which the switching node communicates with the destination leaf node, or if the addressing information of the aggregation node corresponding to the destination leaf node is inconsistent with the addressing information of the switching node, the switching node obtains a second forwarding port connected to a spine node, and forwards the packet using the second forwarding port. The second forwarding port that is connected to the spine node and that is obtained by the switching node may be a port connected to any spine node.

3. The switching node is a spine node.

The switching node obtains the addressing information that is of the switching node and that is sent by the controller.

The switching node receives the packet from an aggregation node, where the destination MAC address field of the packet carries the addressing information of the destination leaf node, and the IP address field of the packet carries the IP address of the destination server.

The switching node determines, according to the addressing information of the destination leaf node and the calculation formula VD_Num mod(p), the destination aggregation node corresponding to the destination leaf node in order to determine a forwarding port for communicating with the destination aggregation node, and sends the packet to the destination aggregation node using the forwarding port such that the destination aggregation node sends the packet to the destination leaf node.

Figure 8:
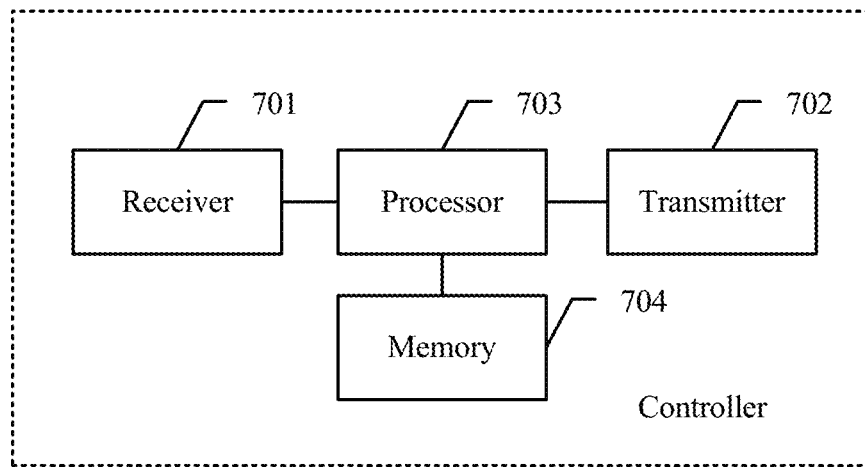
FIG. 8 is a schematic structural diagram of an embodiment of a controller according to the present disclosure.

The foregoing describes the packet forwarding method of the present disclosure, and the following describes a structure of a related apparatus in packet forwarding from a perspective of an apparatus. Referring to FIG. 8, FIG. 8 is a schematic structural diagram of a controller according to the present disclosure. The controller may include a receiver 701, a transmitter 702, a processor 703, and a memory 704. The memory 704 may include a read-only memory (ROM) and a random access memory (RAM), and provides an instruction and data for the processor 703. A part of the memory 704 may further include a nonvolatile RAM (NVRAM).

The memory 704 stores the elements such as, an executable module or data structure, a subset thereof, or an extended set thereof: operation instructions, including various operation instructions to implement various operations, and an operating system, including various system programs to implement various basic services and process hardware-based tasks.

In this embodiment of the present disclosure, the processor 703 is configured to generate addressing information for a switching node, and record a correspondence between the switching node and the addressing information.

The transmitter 702 is configured to send the addressing information to the switching node such that the switching node forwards a packet according to the addressing information.

The multistage switching network includes multiple switching nodes, the multiple switching nodes include a leaf node, an aggregation node, and a spine node, and the switching node is any one of the multiple switching nodes.

Addressing information of a leaf node includes a VD_Num of the leaf node, a value range of VD_Num is [0, np−1], p is a quantity of ports, on an aggregation node, connected to a leaf node located on a same vertical dimension plane with the aggregation node, and n is a quantity of aggregation nodes on one horizontal dimension plane.

Addressing information of an aggregation node includes an HD_Num and an agg_Num of the aggregation node, a value range of HD_Num is [0, k−1], a value range of agg_Num is [0, n−1], and k is a quantity of ports, on a leaf node, connected to an aggregation node located on a same vertical dimension plane with the leaf node.

Addressing information of a spine node includes an HD_Num and a spine_Num of the spine node, a value range of HD_Num is [0, k−1], a value range of spine_Num is [0, m−1], and m is a quantity of spine nodes on one horizontal dimension plane.

Optionally, the correspondence between the switching node and the addressing information includes a correspondence between an IP address of the switching node and the addressing information. The receiver 701 is configured to receive an ARP request sent by a server, where the ARP request carries the IP address of the switching node.

The processor 703 is further configured to send an ARP response to the server according to the correspondence, where the ARP response carries the addressing information such that the server uses the addressing information as a MAC address of the switching node when sending a packet.

Figure 9:
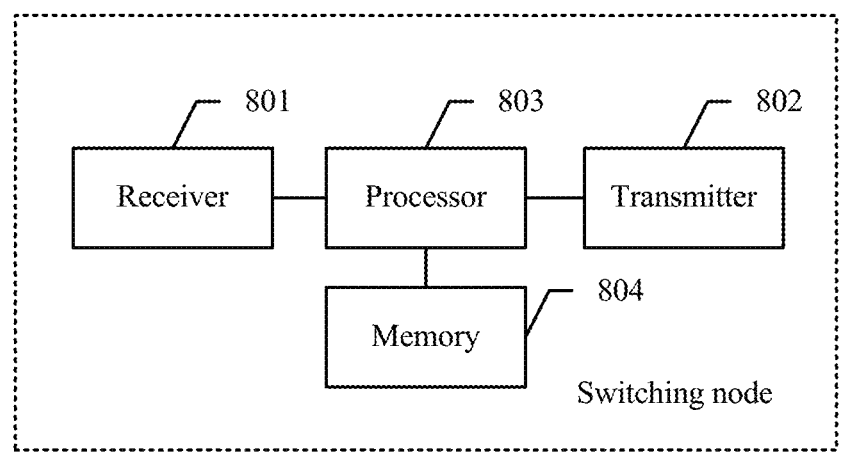
FIG. 9 is a schematic structural diagram of an embodiment of a switching node according to the present disclosure.

Referring to FIG. 9, FIG. 9 is a schematic structural diagram of a switching node according to the present disclosure. The switching node may include a receiver 801, a transmitter 802, a processor 803, and a memory 804. The memory 804 may include a ROM and a RAM, and provides an instruction and data for the processor 803. A part of the memory 804 may further include an NVRAM.

The memory 804 stores the elements such as, an executable module or data structure, a subset thereof, or an extended set thereof: operation instructions, including various operation instructions to implement various operations, and an operating system, including various system programs to implement various basic services and process hardware-based tasks.

In this embodiment of the present disclosure, the receiver 801 is configured to receive a packet, where a destination MAC address field of the packet carries addressing information of a destination leaf node, and an IP address field of the packet carries an IP address of a destination server.

The processor 803 is configured to obtain addressing information that is of the switching node and that is sent by a controller, obtain a forwarding port of the packet, and forward the packet using the forwarding port.

When the switching node is a leaf node, the addressing information includes a VD_Num of the leaf node, a value range of VD_Num is [0, np−1], p is a quantity of ports, on an aggregation node, connected to a leaf node located on a same vertical dimension plane with the aggregation node, and n is a quantity of aggregation nodes on one horizontal dimension plane.

When the switching node is an aggregation node, the addressing information includes an HD_Num and an agg_Num of the aggregation node, a value range of HD_Num is [0, k−1], a value range of agg_Num is [0, n−1], and k is a quantity of ports, on a leaf node, connected to an aggregation node located on a same vertical dimension plane with the leaf node.

When the switching node is a spine node, the addressing information includes an HD_Num and a spine_Num of the spine node, a value range of HD_Num is [0, k−1], a value range of spine_Num is [0, m−1], and m is a quantity of spine nodes on one horizontal dimension plane.

Optionally, the switching node is a leaf node, and the processor 803 is further configured to obtain the addressing information that is of the switching node and that is sent by the controller, determine a source of the packet, and when the packet is from another switching node, obtain a MAC address of the destination server and a forwarding port corresponding to the MAC address, and after replacing the addressing information of the destination leaf node in the MAC address field of the packet with the MAC address of the destination server, send the packet to the destination server using the forwarding port, or when the packet is from a server, obtain a forwarding port connected to an aggregation node, and forward the packet using the forwarding port.

Optionally, the switching node is an aggregation node, and the processor 803 is further configured to obtain the addressing information that is of the switching node and that is sent by the controller, determine a source of the packet, and when the packet is from a leaf node, determine whether addressing information of an aggregation node corresponding to the destination leaf node is consistent with the addressing information of the switching node, and if the addressing information of the aggregation node corresponding to the destination leaf node is consistent with the addressing information of the switching node, obtain a first forwarding port by means of calculation according to the addressing information of the destination leaf node, and send the packet to the destination leaf node using the first forwarding port, where the first forwarding port is a port over which the switching node communicates with the destination leaf node, or if the addressing information of the aggregation node corresponding to the destination leaf node is inconsistent with the addressing information of the switching node, obtain a second forwarding port connected to a spine node, and forward the packet using the second forwarding port.

Optionally, the switching node is a spine node, and receiving a packet by the switching node includes receiving, by the switching node, the packet from an aggregation node.

The processor 803 is further configured to obtain the addressing information that is of the switching node and that is sent by the controller, determine, according to the addressing information of the destination leaf node, a forwarding port over which a destination aggregation node corresponding to the destination leaf node communicates with the switching node, and send the packet to the destination aggregation node using the forwarding port such that the destination aggregation node sends the packet to the destination leaf node.

For relevant descriptions of the foregoing apparatus, refer correspondingly to relevant descriptions and effects in the method embodiment part for understanding, and details are not described herein.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A packet forwarding method, applied to a multistage switching network, comprising:
obtaining, by a switching node, addressing information of the switching node from a controller;
receiving, by the switching node, a packet, wherein a destination media access control (MAC) address field of the packet carries addressing information of a destination leaf node, and wherein an Internet Protocol (IP) address field of the packet carries an IP address of a destination server;
obtaining, by the switching node, a forwarding port of the packet; and
forwarding, by the switching node, the packet using the forwarding port,
wherein the addressing information of the switching node comprises a vertical dimension plane number (VD_Num) of a leaf node when the switching node comprises the leaf node,
wherein a value range of the VD_Num comprises [0, np−1],
wherein p comprises a quantity of ports on a first aggregation node coupled to a leaf node located on a same vertical dimension plane with the first aggregation node,
wherein n comprises a quantity of aggregation nodes on one horizontal dimension plane,
wherein the addressing information of the switching node comprises a horizontal dimension plane number (HD_Num) and a serial number of an aggregation node (agg_Num) when the switching node comprises the aggregation node,
wherein a value range of the HD_Num comprises [0, k−1],
wherein a value range of the agg_Num comprises [0, n−1],
wherein k comprises a quantity of ports on a first leaf node coupled to an aggregation node located on a same vertical dimension plane with the first leaf node,
wherein the addressing information of the switching node comprises another HD_Num and a serial number of a spine node (spine_Num) when the switching node comprises the spine node,
wherein a value range of the other HD_Num comprises [0, k−1],
wherein a value range of the spine_Num comprises [0, m−1], and
wherein m comprises a quantity of spine nodes on one horizontal dimension plane.

2. The method according to claim 1, wherein the switching node comprises a leaf node, and wherein obtaining the forwarding port of the packet and forwarding the packet comprises:
determining, by the switching node, a source of the packet;
obtaining, by the switching node, a MAC address of the destination server and a forwarding port corresponding to the MAC address, replacing the addressing information of the destination leaf node in the MAC address field of the packet with the MAC address of the destination server, and sending the packet to the destination server using the forwarding port when the packet is from another switching node; and
obtaining, by the switching node, a forwarding port coupled to an aggregation node, and forwarding the packet using the forwarding port coupled to the aggregation node when the packet is from a server.

3. The method according to claim 1, wherein the switching node comprises an aggregation node, and wherein obtaining the forwarding port of the packet and forwarding the packet comprises:
determining, by the switching node, a source of the packet;
determining, by the switching node, whether addressing information of an aggregation node corresponding to the destination leaf node is consistent with the addressing information of the switching node when the packet is from a leaf node;
obtaining, by the switching node, a first forwarding port by calculation according to the addressing information of the destination leaf node, and sending the packet to the destination leaf node using the first forwarding port when the addressing information of the aggregation node corresponding to the destination leaf node is consistent with the addressing information of the switching node, wherein the first forwarding port comprises a port over which the switching node communicates with the destination leaf node; and
obtaining, by the switching node, a second forwarding port coupled to a spine node, and forwarding the packet using the second forwarding port when the addressing information of the aggregation node corresponding to the destination leaf node is inconsistent with the addressing information of the switching node.

4. The method according to claim 1, wherein the switching node comprises a spine node, wherein receiving the packet comprises receiving, by the switching node, the packet from an aggregation node, and wherein obtaining the forwarding port of the packet and forwarding the packet comprises:
determining, by the switching node according to the addressing information of the destination leaf node, a forwarding port over which a destination aggregation node corresponding to the destination leaf node communicates with the switching node; and
sending the packet to the destination aggregation node using the determined forwarding port.

5. A switching node, applied to a multistage switching network, comprising:
a receiver configured to receive a packet, wherein a destination media access control (MAC) address field of the packet carries addressing information of a destination leaf node, and wherein an Internet Protocol (IP) address field of the packet carries an IP address of a destination server; and
a processor coupled to the receiver and configured to:
obtain addressing information of the switching node from a controller;
obtain a forwarding port of the packet; and
forward the packet using the forwarding port,
wherein the addressing information of the switching node comprises a vertical dimension plane number (VD_Num) of a leaf node when the switching node comprises the leaf node,
wherein a value range of the VD_Num comprises [0, np−1],
wherein p comprises a quantity of ports on a first aggregation node coupled to a leaf node located on a same vertical dimension plane with the first aggregation node,
wherein n comprises a quantity of aggregation nodes on one horizontal dimension plane,
wherein the addressing information of the switching node comprises a horizontal dimension plane number (HD_Num) and a serial number of an aggregation node (agg_Num) when the switching node comprises the aggregation node, wherein a value range of the HD_Num comprises [0, k−1], wherein a value range of the agg_Num comprises [0, n−1], wherein k comprises a quantity of ports on a first leaf node coupled to an aggregation node located on a same vertical dimension plane with the first leaf node, wherein the addressing information of the switching node comprises another HD_Num and a serial number of a spine node (spine_Num) when the switching node comprises the spine node, wherein a value range of the other HD_Num comprises [0, k−1], wherein a value range of the spine_Num comprises [0, m−1], and wherein m comprises a quantity of spine nodes on one horizontal dimension plane.

6. The switching node according to claim 5, wherein the switching node comprises a leaf node, and wherein the processor is further configured to:
   obtain the addressing information of the switching node from the controller;
   determine a source of the packet;
   obtain a MAC address of the destination server and a forwarding port corresponding to the MAC address, replace the addressing information of the destination leaf node in the MAC address field of the packet with the MAC address of the destination server, and send the packet to the destination server using the forwarding port when the packet is from another switching node; and
   obtain a forwarding port coupled to an aggregation node, and forward the packet using the forwarding port coupled to the aggregation node when the packet is from a server.

7. The switching node according to claim 5, wherein the switching node comprises an aggregation node, and wherein the processor is further configured to:
   obtain the addressing information of the switching node from the controller;
   determine a source of the packet;
   determine whether addressing information of an aggregation node corresponding to the destination leaf node is consistent with the addressing information of the switching node when the packet is from a leaf node;
   obtain a first forwarding port by calculation according to the addressing information of the destination leaf node, and send the packet to the destination leaf node using the first forwarding port when the addressing information of the aggregation node corresponding to the destination leaf node is consistent with the addressing information of the switching node, wherein the first forwarding port comprises a port over which the switching node communicates with the destination leaf node; and
   obtain a second forwarding port coupled to a spine node, and forward the packet using the second forwarding port when the addressing information of the aggregation node corresponding to the destination leaf node is inconsistent with the addressing information of the switching node.

8. The switching node according to claim 5, wherein the switching node comprises a spine node, wherein the packet is received from an aggregation node, and wherein the processor is further configured to:
   obtain the addressing information of the switching node from the controller;
   determine, according to the addressing information of the destination leaf node, a forwarding port over which a destination aggregation node corresponding to the destination leaf node communicates with the switching node; and
   send the packet to the destination aggregation node using the determined forwarding port.

* * * * *